(12) United States Patent
Yu et al.

(10) Patent No.: US 10,014,954 B2
(45) Date of Patent: Jul. 3, 2018

(54) IMAGING CANCELLATION IN HIGH-SPEED INTENSITY MODULATION AND DIRECT DETECTION SYSTEM WITH DUAL SINGLE SIDEBAND MODULATION

(71) Applicant: ZTE Corporation, Shenzhen (CN)

(72) Inventors: Jianjun Yu, Basking Ridge, NJ (US); Yuanquan Wang, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/442,523

(22) Filed: Feb. 24, 2017

(65) Prior Publication Data

US 2017/0250760 A1    Aug. 31, 2017

Related U.S. Application Data

(60) Provisional application No. 62/300,688, filed on Feb. 26, 2016.

(51) Int. Cl.
*H04B 10/61* (2013.01)
*H04J 14/02* (2006.01)

(52) U.S. Cl.
CPC ........ *H04B 10/616* (2013.01); *H04J 14/0298* (2013.01)

(58) Field of Classification Search
CPC ..................... H04B 10/60–10/6973
See application file for complete search history.

(56) References Cited

U.S. PATENT DOCUMENTS

| | | | |
|---|---|---|---|
| 7,266,310 B1* | 9/2007 | Savory | H04B 10/61 398/205 |
| 2004/0156644 A1* | 8/2004 | Yasue | H04B 10/5057 398/198 |
| 2009/0274462 A1* | 11/2009 | Yu | H04B 10/2587 398/68 |

(Continued)

OTHER PUBLICATIONS

Chien, H.-C., et al., "Optical independent-sideband modulation for bandwidth-economic coherent transmission," Optics Express, 22(8): 9465-9470, Apr. 2014.

(Continued)

*Primary Examiner* — David Payne
*Assistant Examiner* — Casey Kretzer
(74) *Attorney, Agent, or Firm* — Perkins Coie LLP

(57) ABSTRACT

Provided are methods and systems for receiving and processing optical signals. A dual single side band (SSB) modulation scheme is utilized to take advantage of a given wavelengths' bandwidth. Modulation schemes are employed that modulate each SSB with their In-phase (I) and Quadrature (Q) components. The methods and systems discussed utilize an adaptive equalizer and an LMS algorithm to remove imaging components of the left and right SSBs provided by the modulators. The adaptive equalizer and the LMS algorithm also compensate for linear and nonlinear distortions. Various algorithms can be employed, including but not limited to, algorithms for updating crosstalk coefficients in the equalizer, where the cross talk coefficients are induced from the imaging from the modulation of the dual SSB signal, and for updating coefficients relating to linear and nonlinear distortion.

30 Claims, 19 Drawing Sheets

(56) References Cited

U.S. PATENT DOCUMENTS

| | | | |
|---|---|---|---|
| 2009/0279825 A1* | 11/2009 | Kawanishi | G02F 1/225 385/2 |
| 2011/0002689 A1* | 1/2011 | Sano | H04B 10/69 398/44 |
| 2012/0177368 A1* | 7/2012 | Aoki | H04B 10/616 398/38 |
| 2012/0269297 A1 | 10/2012 | Mishra et al. | |
| 2013/0259174 A1 | 10/2013 | Qian et al. | |
| 2013/0272719 A1 | 10/2013 | Yan et al. | |
| 2014/0105616 A1* | 4/2014 | Yan | H04L 7/0075 398/208 |
| 2014/0270765 A1* | 9/2014 | Cole | H04B 10/27 398/48 |
| 2015/0155948 A1* | 6/2015 | Chen | H04B 10/5165 398/188 |
| 2017/0214485 A1 | 7/2017 | Yu et al. | |

OTHER PUBLICATIONS

Li, X., et al., "Antenna Polarization Diversity for 146Gb/s Polarization Multiplexing QPSK Wireless Signal Delivery at W-band," Optical Fiber Communications Conference and Exhibition (OFC), OSA Technical Digest (online) (Optical Society of America, 2014), Paper M3D.7, 3 pages, Mar. 2014.

Wang, Y., et al., "Demonstration of High-Speed 2×2 Non-Imaging MIMO Nyquist Single Carrier Visible Light communication With Frequency Domain Equalization," Journal of Lightwave Technology, 32(11)2087-2093, Jun. 2014.

Zhang, L., et al., "Transmission of 112-Gb/s+ DMT over 80-km SMF Enabled by Twin-SSB Technique at 1550nm," 2015 European Conference on Optical Communication (ECOC), Paper We4.6.4, 3 pages, Sep. 2015.

\* cited by examiner

IMAGING CANCELLATION IN HIGH-SPEED INTENSITY MODULATION AND DIRECT DETECTION SYSTEM WITH DUAL SINGLE SIDEBAND MODULATION

CROSS REFERENCE TO RELATED APPLICATIONS

This patent document claims the benefit of priority of U.S. Provisional Patent Application No. 62/300,688, filed on Feb. 26, 2016. The entire content of the before-mentioned patent application is incorporated by reference as part of the disclosure of this document.

BACKGROUND

The wide-spread adoption of multimedia services, broadband internet, and cloud services, among others, have driven the demand of high transmission capacity of optical systems such as short-reach links, access, and metro networks. Typically, it requires optical transmission systems with high data rates (e.g., up to 1 Tb/s and beyond). To meet the ever increasing demands, access and metro networks are moving from the classic spectral inefficient single channel non-return to zero (NRZ) modulation to spectral efficient advance modulation formats such as wavelength-division multiplexing (WDM). The spectral efficient modulation formats, however, provide many distortions in their communication channels when used in optical systems.

SUMMARY

The present document relates to optical communication systems. In particular, the present document relates to systems and methods for improving the efficiency of data transfer in optical systems through digitally processing signals that were received optically via a dual single side band (SSB) modulation technique.

In one example aspect, an optical signal is generated by a laser diode and modulated with data, e.g., user data and control data transmitted in an optical network, an IQ Modulator or a Dual Drive Mach-Zehnder Modulator (DD-MZM). These modulators modulate the optical signal by varying its In-phase and Quadrature components to generate a dual SSB signal. At a receiver, the dual SSB signal is received in the optical domain and converted into the digital (electrical) domain, where an adaptive equalizer is implemented to perform imaging cancellation, non-linear distortion compensation, and linear distortion compensation.

In one aspect, the adaptive equalizer employs a least means square (LMS) algorithm to update crosstalk coefficients that are induced from the imaging from the modulation of the dual SSB signal. Updating the crosstalk coefficients via an LMS algorithm removes the imaging components of the dual SSB's left and right SSB that were created by the modulator. In yet another aspect, the LMS algorithm updates coefficients to compensate for linear and nonlinear distortion.

By adopting imaging cancellation in an optical system using an LMS algorithm, the performance of an intensity modulation and direct detection (IM/DD) systems can be improved. The use of modulators that create imaging components as a by-product of their modulation in IM/DD systems can be improved through the use of an LMS algorithm. In addition, by adopting an LMS algorithm to update coefficients to compensate for linear and nonlinear distortion, the performance of an IM/DD system can be improved.

In yet another aspect a method, implemented at a receiver in an optical network, comprises receiving a dual single side band (SSB) modulated optical signal on a transmission fiber, wherein the dual SSB modulated optical signal includes a left SSB modulated optical signal and a right SSB modulated optical signal; band-pass filtering the dual SSB modulated optical signal with optical filters to obtain the left SSB modulated optical signal and the right SSB modulated optical signal; converting the left SSB modulated optical signal to a left SSB modulated electrical signal, and the right SSB modulated optical signal to a right SSB modulated electrical signal; resampling the left and the right SSB modulated electrical signals; and implementing a least means square (LMS) algorithm for performing one or more of imaging cancellation, compensation of linear distortions, and compensation of nonlinear distortions on the resampled left and right SSB modulated electrical signals. In an embodiment, the adaptive equalizer performs imaging cancellation with one or more finite impulse response (FIR) filters that comprises coefficients, the coefficients being updated by the LMS algorithm. In yet another embodiment, the coefficients comprise crosstalk coefficients induced from imaging from the dual SSB modulated optical signal. In some embodiments, the LMS algorithm includes minimizing one or more of linear and non-linear distortions by updating coefficients relating to one or more of linear and nonlinear distortions. In some embodiments, the LMS algorithm comprises an algorithm for the resampled right SSB modulated electrical signal and an algorithm for the resampled left SSB modulated electrical signal. In an embodiment, the method implemented at the receiver further comprises down-converting and estimating a phase of outputs of the resampled left and right SSB modulated electrical signals after performing one or more of imaging cancellation, compensation of linear distortions, and compensation of nonlinear distortions. In some embodiment, the method of down-converting further comprises de-modulating a result of the phase estimation. In an embodiment, the method implemented at the receiver further comprises digitizing the left and the right SSB modulated electrical signal. In an embodiment, the method implemented at the receiver further comprises electrically amplifying the left and the right SSB modulated electrical signal. In some embodiments, the dual SSB modulated optical signal is modulated with orthogonal frequency division multiplexing (OFDM). In some embodiments, the dual SSB modulated optical signal is modulated with a Dual Drive Mach-Zehnder Modulator. In some embodiments, the dual SSB modulated optical signal is modulated with wavelength-division multiplexing (WDM). In some embodiments, the dual SSB modulated optical signal is modulated with discrete multi-tone modulation (DMT). In some embodiments, the dual SSB modulated optical signal is modulated with quadrature amplitude modulation (QAM).

In yet another aspect, a receiver in an optical network, comprises a first optical band-pass filter and a second optical band-pass filter configured to receive a dual single side band (SSB) modulated optical signal on a transmission fiber, wherein: the dual SSB modulated optical signal includes a left SSB modulated optical signal and a right SSB modulated optical signal, the first optical band-pass filter configured to band-pass filter the dual SSB optical signal to obtain the left SSB modulated optical signal, and the second optical band-pass filter configured to band-pass filter the dual SSB optical signal to obtain the right SSB modulated optical signal; a first photodiode configured to convert the left SSB modulated optical signal to a left SSB modulated electrical signal; a second photodiode configured to convert the right SSB modulated optical signal to a right SSB modulated electrical signal; and a processor configured to resample the left and the right SSB modulated electrical signal; an adaptive equalizer configured to utilize a least means square (LMS) algorithm to perform one or more of imaging cancellation, compensation of linear distortions, and compensation of nonlinear distortions on the resampled left and right SSB modulated electrical signals. In another embodiment, the adaptive equalizer is enabled to perform imaging cancellation with one or more finite impulse response (FIR) filters that comprises coefficients, the coefficients configured to being updated by the LMS algorithm. In yet another embodiment, the coefficients comprise crosstalk coefficients induced from imaging from the dual SSB modulated optical signal. In some embodiments, the LMS algorithm is enabled to further compensate for one or more of linear and nonlinear distortions by updating coefficients relating to one or more of linear and nonlinear distortions. In some embodiments, the LMS algorithm comprises an algorithm for the resampled right SSB modulated electrical signal and an algorithm for the left SSB modulated electrical signal. In some embodiments, the processor is further configured to down-convert and estimate a phase of the resampled left and right SSB modulated electrical signals. In some embodiments, the receiver further comprises one or more demodulators configured to demodulate the phase estimated resampled left and right SSB modulated electrical signals. In some embodiments, the receiver further comprises an analog digital converter configured to digitize the left and the right SSB modulated electrical signal. In some embodiments, the receiver further comprises an amplifier configured to electrically amplify the left and the right SSB modulated electrical signal. In some embodiments, the dual SSB modulated optical signal is modulated with orthogonal frequency division multiplexing (OFDM). In some embodiments, the dual SSB modulated optical signal is modulated with a Dual Drive Mach-Zehnder Modulator. In some embodiments, the dual SSB modulated optical signal is modulated with wavelength-division multiplexing (WDM). In some embodiments, the dual SSB modulated optical signal is modulated with carrier-less amplitude phase modulation (CAP). In some embodiments, the dual SSB modulated optical signal is modulated with quadrature amplitude modulation (QAM).

In yet another aspect, an optical communication system comprises a transmitter configured to transmit a dual single side band (SSB) modulated optical signal on a transmission fiber, wherein the dual SSB modulated optical signal includes a left SSB modulated optical signal and a right SSB modulated optical signal; a receiver configured to receive the dual SSB modulated optical signal, wherein the receiver includes a first optical band-pass filter configured to band-pass filter the dual SSB optical signal to obtain the left SSB modulated optical signal, and a second optical band-pass filter configured to band-pass filter the dual SSB optical signal to obtain the right SSB modulated optical signal; a first photodiode configured to convert the left SSB modulated optical signal to a left SSB modulated electrical signal; a second photodiode configured to convert the right SSB modulated optical signal to a right SSB modulated electrical signal; and a processor configured to resample the left and the right SSB modulated electrical signal; an adaptive equalizer configured to utilize a least means square (LMS) algorithm to perform one or more of imaging cancellation, compensation of linear distortions, and compensation of nonlinear distortions on the resampled left and right SSB modulated electrical signals. In some embodiments, the adaptive equalizer is enabled to perform imaging cancellation with one or more finite impulse response (FIR) filters that comprises coefficients, the coefficients configured to being updated by the LMS algorithm. In some embodiments, the coefficients comprise crosstalk coefficients induced from imaging from the dual SSB modulated optical signal. In some embodiments, the LMS algorithm is enabled to further compensate for one or more of linear and nonlinear distortions by updating coefficients relating to one or more of linear and nonlinear distortions. In some embodiments, the LMS algorithm comprises an algorithm for the resampled right SSB modulated electrical signal and an algorithm for the left SSB modulated electrical signal These and other aspects, and example implementations and variations are set forth in the drawings, the description and the claims.

DETAILED DESCRIPTION

To meet the increasing demand on high data communication bandwidth, developers are continuously looking for new ways by which to carry a greater number of data bits over existing communication infrastructure. In optical communication, data is transmitted over optical carriers, e.g., glass or plastic optical fibers by modulating using a variety of different techniques. Some techniques implement data modulation in the electrical domain, e.g., by processing electronic signals. Alternatively, or in addition, data modulation can also be achieved in the optical domain.

Intensity modulation and direct detection (IM/DD) and wavelength-division multiplexing (WDM) are provided as alternatives to non-return to zero (NRZ) modulation due to their low cost, power consumption, and complexity. IM/DD and WDM are competitive candidates for next generation passive optical networks.

Systems described herein can utilize various modulation techniques such as wavelength-division multiplexing (WDM), intensity modulation and direct detection (IM/DD), discrete multitoned modulation (DMT), orthogonal frequency-division multiplexing (OFDM), carrier-less amplitude phase modulation (CAP), and quadrature amplitude modulation (QAM). Various techniques such as single sideband (SSB), dual SSB, and vestigial sideband (VSB) can also be utilized.

Figure 1:
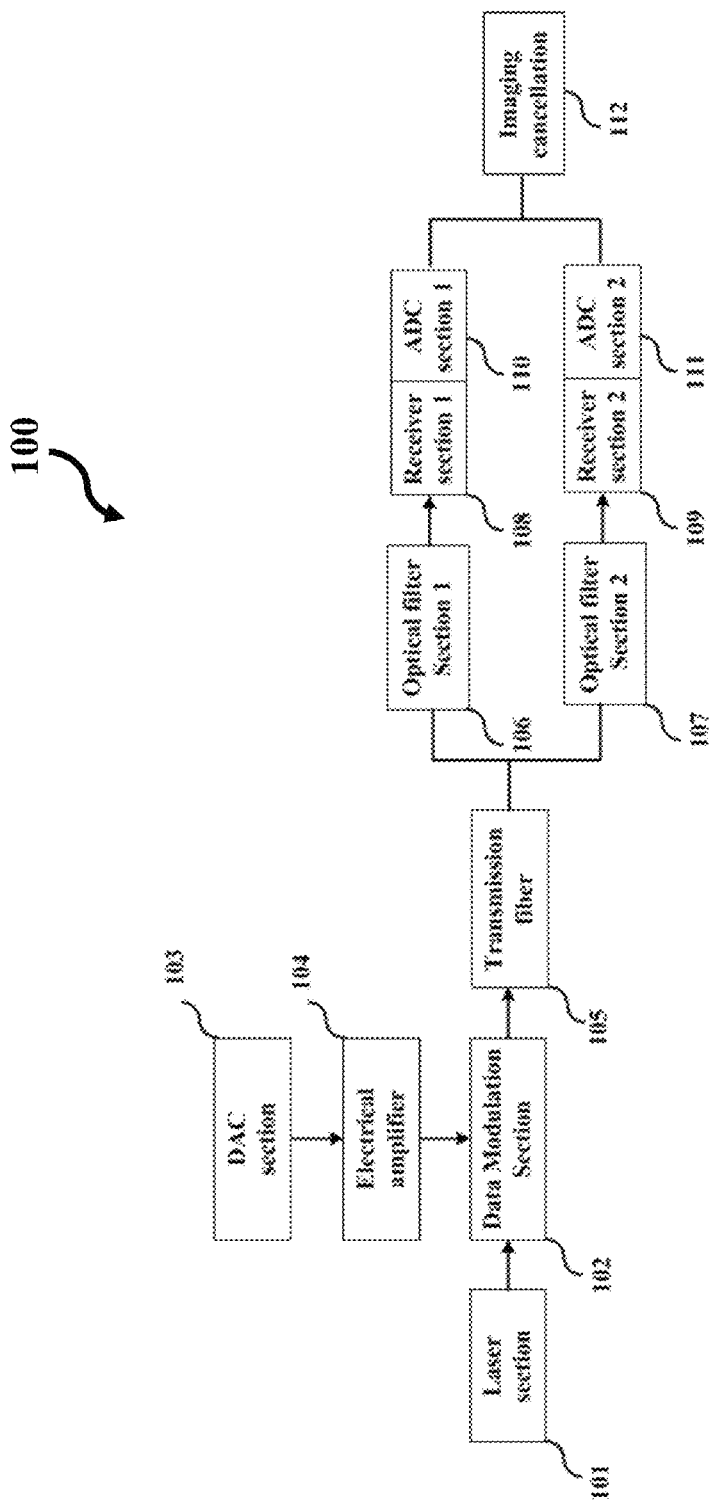
FIG. 1 shows an example block diagram of a system to transmit and receive signals.

FIG. 1 shows an example block diagram of an Optical Communication System 100 used to generate and receive optical signals. At the transmitter side, Laser Section 101 generates an optical signal. The Laser Section 101 can be used to generate optical signals at one or many different wavelengths. The optical signal from Laser Section 101 is coupled to the Data Modulation Section 102 which modulates the optical signal supplied from the Laser Section 101.

A Digital to Analog Section 103 receives digital data that is modulated onto the carrier signal for transmission over the Optical Transmission Fiber 105. The Digital to Analog Section 103 converts an inputted digital signal into an analog signal. The analog signal may be amplified and conditioned (e.g., low pass filtered) through an Electrical Amplifier 104. The output of the Electrical Amplifier 104 is used by the Data Modulation Section 102 to modulate the optical carrier from the Laser Section 101. The signal from the Data Modulation Section 102 is transmitted on the Optical Transmission Fiber 105. The signal transmitted on the Optical Transmission Fiber 105 may go through intermediate optical equipment such as amplifiers, repeaters, switches, etc., which are not shown.

At the receiver side, the modulated optical signal is received and processed at two separate filters, Optical Filter Section 1 106 and Optical Filter Section 2 107. Optical Filter Section 1 106 and Optical Filter Section 2 107 can be made of standard optical filters that filter out signals of undesired wavelengths. After the optical signals are filtered from Optical Filter Section 1 106 and Optical Filter Section 2 107, the signals are inputted into Receiver Section 1 108 and Receiver Section 2 109, respectively. Receiver Section 1 108 and Receiver Section 2 109 convert the optical signals into electrical signals and transmit the electrical signals to the Analog to Digital Convertor Section 1 110 and Analog to Digital Convertor Section 2, respectively, where the signals are converted from analog to digital. The digital signals are then provided to an Imaging Cancellation Section 112 which is used to remove imaging that is induced by the Data Modulation Section 102.

FIGS. 2-13 illustrate expanded examples of components, signals, and outputs of the block diagram of FIG. 1 and provide further detail regarding example embodiments. The components and techniques are only illustrative. It is considered that any known system for the transmission, reception, and modulation of optical signals can be utilized.

Figure 2:
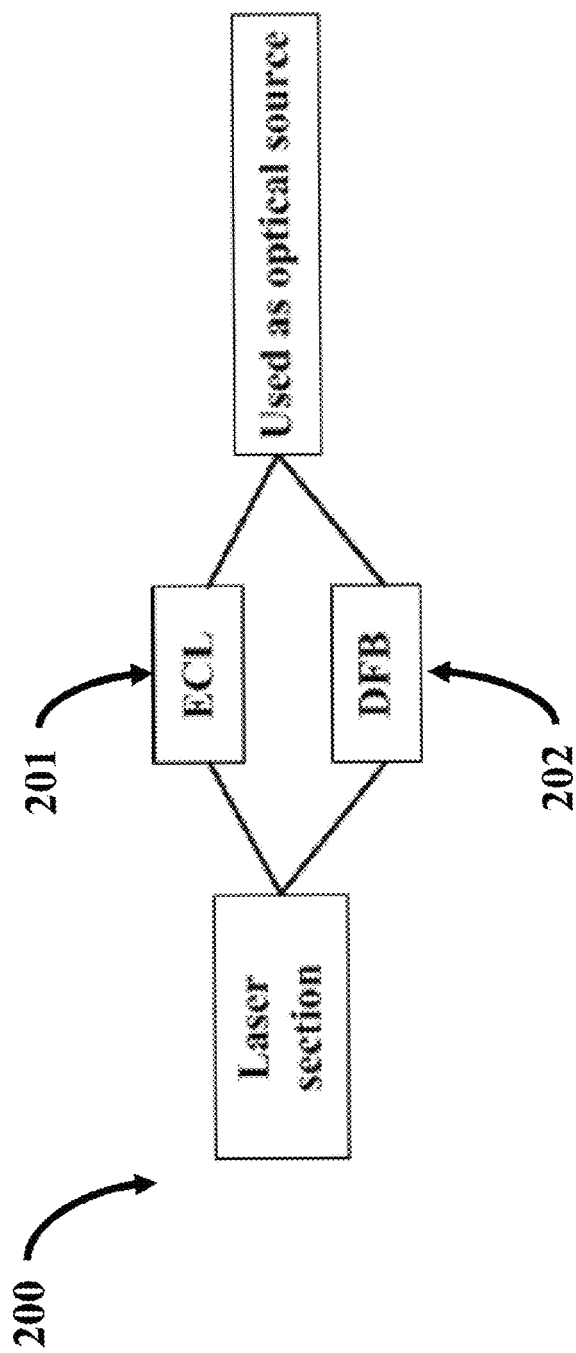
FIG. 2 shows an example diagram of optical sources for a laser section.

FIG. 2 is an example block diagram of various optical sources that can be used for the Laser Section 101. In some embodiments, Laser Section 101 may use an External Cavity Laser (ECL) 201. Some embodiments of Laser Section 101 may use a Distributed Feedback Laser (DFB) 202. The examples of optical sources for Laser Section 101 are only illustrative and any optical source known in the art to generate optical signals can be used.

Figure 3:
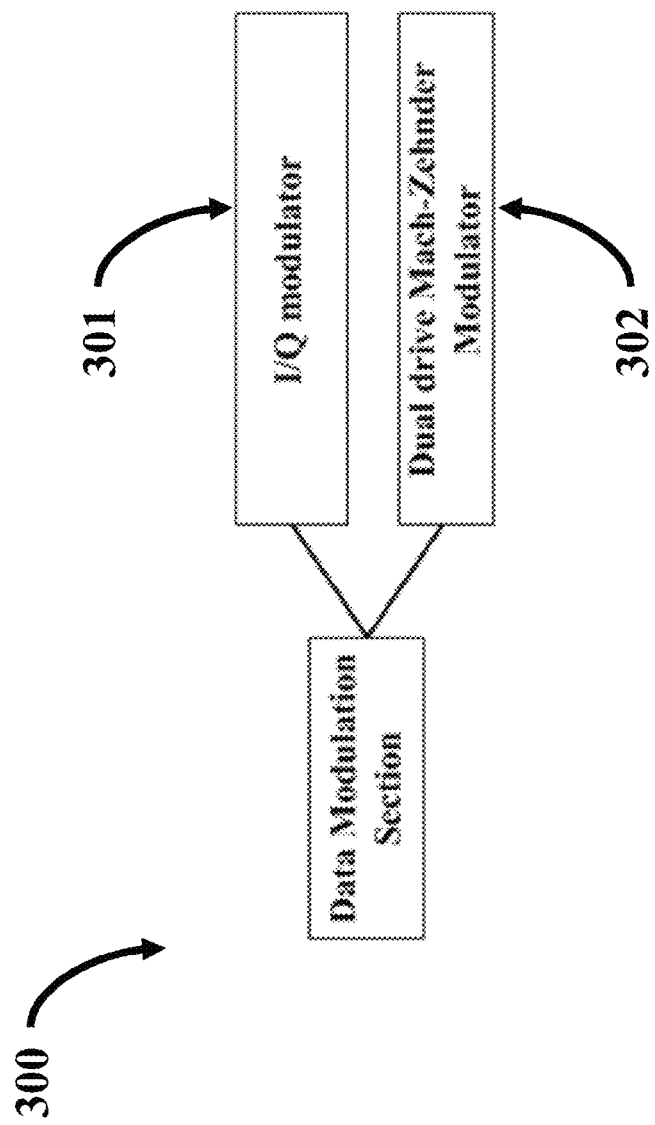
FIG. 3 shows an example diagram of modulators for the data modulation section.

FIG. 3 is an example block diagram of various modulators that can be utilized by the Data Modulation Section 102. In some embodiments, an IQ Modulator 301 can be used to modulate optical signals. In some embodiments, a Dual Drive Mach-Zehnder Modulator (DD-MZM) 302 can be utilized to modulate optical signals. The IQ Modulator 301 and the DD-MZM 302 can use an In-phase and Quadrature component, 90 degrees out of phase, to modulate an optical signal. Both the IQ Modulator 301 and the DD-MZM Modulator 302 can be configured to provide dual single side band (SSB) modulation, where both side bands of any given wavelength can be used to transmit data.

Figures 4A, 4B, 4C:
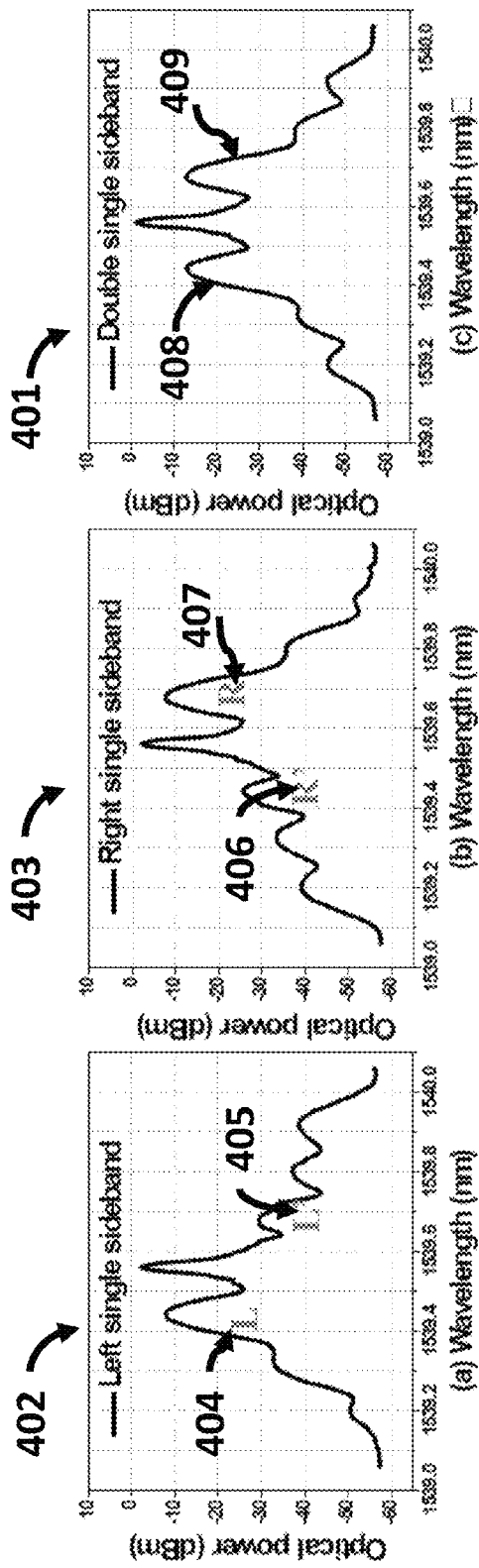
FIGS. 4A-4C show example spectra outputs of a double single sideband that includes a left single side band and a right single side band and their imaging components.

FIGS. 4A-4C are example diagrams of a Dual SSB Signal 401 provided from the Data Modulation Section 102. The Dual SSB Signal 401 is centered around a wavelength of approximately 1539.55 nm. The wavelengths described are only illustrative and any wavelength or channel can be used. The Dual SSB Signal 401 is composed of two components—a Left SSB Signal 402 and a Right SSB Signal 403. The Left SSB Signal 402 is made of both a Left SSB Component L 404 and a Left SSB Imaging Component L' 405. Similarly, the Right SSB Signal 403 is made of both a Right SSB Component R 406 and a Right SSB Imaging Component R' 407. The Dual SSB Signal 401 is the combined signal of the Left SSB Signal 402 and the Right SSB Signal 403, with both of their SSB components (Left SSB Component L 404 and Right SSB Component R 406) and imaging components (Left SSB Imaging Component L' 405 and Right SSB Imaging Component R' 407). The Left SSB 408 of the Dual SSB Signal 401 is the Left SSB Component L 404 and the Right SSB Imaging Component R' 407. The Right SSB 409 of the Dual SSB Signal 401 is the Right SSB Component R 407 and the Left SSB Imaging Component L' 405.

As a mathematical example, a Left SSB Signal can be expressed as:

$$E_l(t)=A(t)\exp(j\varphi_l(t))\exp(-jw_l t). \quad \text{Eq. (1)}$$

A Right SSB Signal can be expressed as:

$$E_r(t)=B(t)\exp(j\varphi_r(t))\exp(jw_r t). \quad \text{Eq. (2)}$$

A(t) and B(t) are the amplitude of the left and right side band, respectively. $\varphi_l$ and $\varphi_r$ are the phases of the left and right sideband, respectively. A Dual SSB Signal can be expressed as:

$$E(t)=E_l(t)+E_r(t). \quad \text{Eq. (3)}$$

In some embodiments, the spectra of the left SSB 401 and right SSB 402 are non-overlapping. In some embodiments, the left SSB 401 can be anywhere from a given wavelength, from $W_0$ to W, and the right SSB 402 can be anywhere from a given wavelength W to $W_1$.

Figure 5:
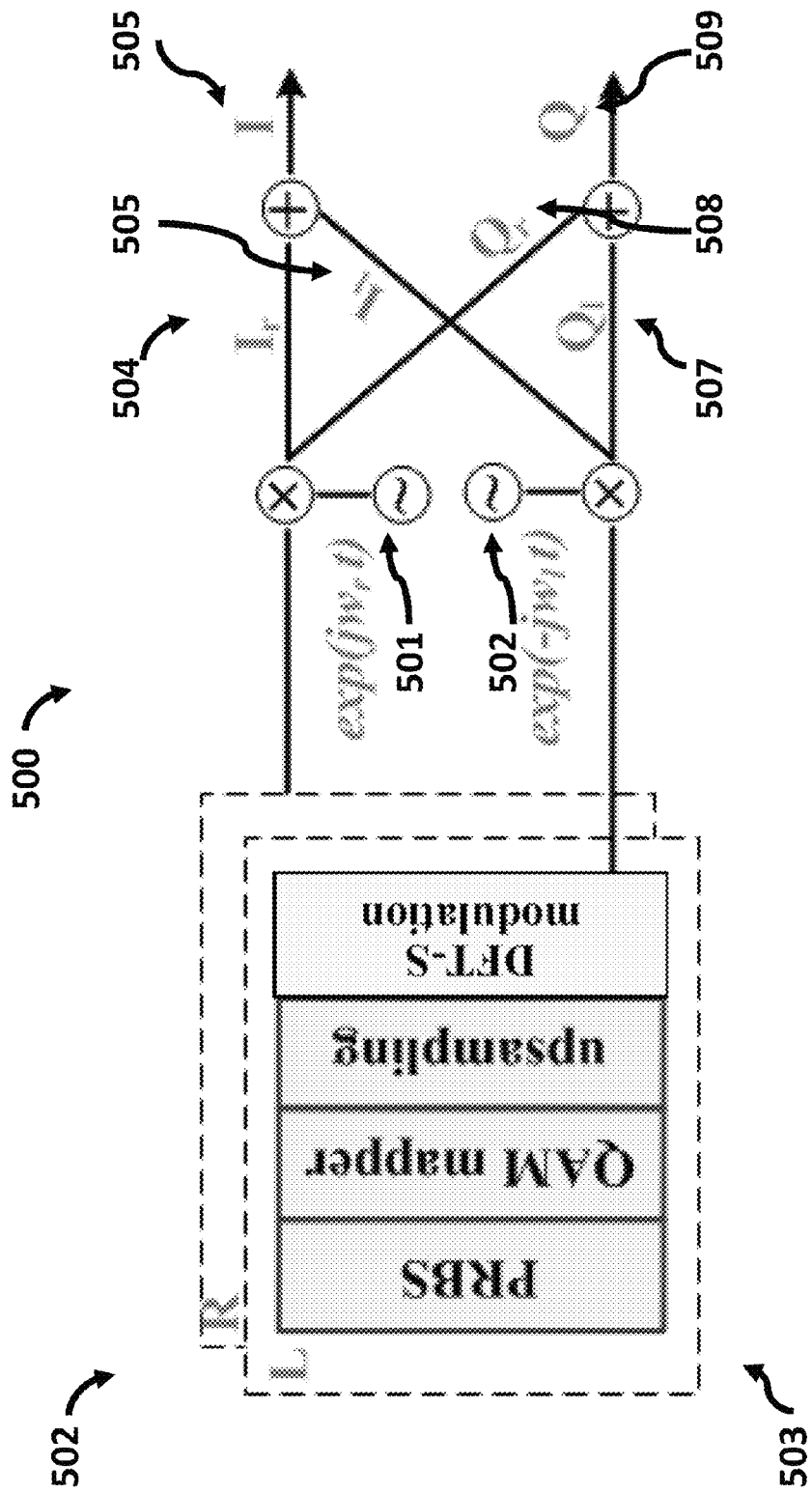
FIG. 5 shows an example diagram of an architecture to generate in-phase and quadrature signals to generate a dual SSB signal.
Figure 6:
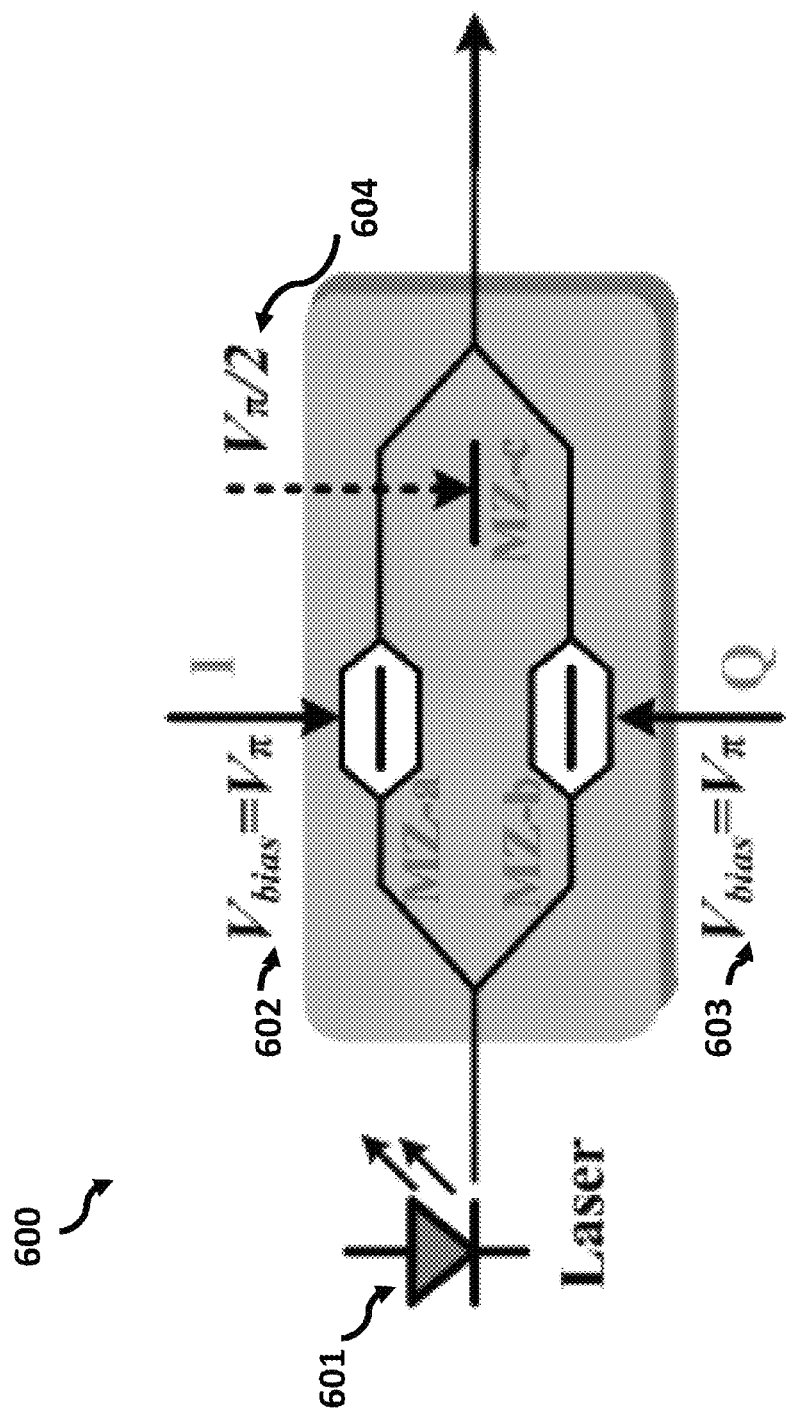
FIG. 6 shows an example Dual Drive Mach-Zehnder Modulator.

FIGS. 5-6 provide illustrative examples of modulators that can be utilized to simultaneously generate two wavelength channels by the same modulator. FIGS. 5-6 are only illustrative and other modulation techniques for the generation of dual-SSB modulation techniques can be utilized.

FIG. 5 is an example block diagram of an Architecture 500 that is used to generate a Dual SSB Signal modulating with an In-Phase component (I) and a Quadrature component (Q). In some embodiments, the architecture 500 may be implemented in a DSP. A Carrier Signal for the Right SSB Signal 501 and a Carrier Signal for the Left SSB 502 is multiplied with the data signal from the Right SSB IQ Modulator 502 and Left SSB IQ Modulator 503. As illustrated, to generate the output Q and I components, the DSP Architecture 500 performs PRBS, QAM, up-samples, and performs Discrete Fourier Transform-Spread (DFT-S) OFDM modulation. These techniques are only illustrative and other intensity modulation formats can be utilized and any known signal conditioning techniques may be utilized. It is understood that any number of symbols can be generated by the QAM mapper.

In phase components $I_r$ 504 and $I_l$ 505 from the Right SSB IQ Modulator 502 and Left SSB IQ Modulator 503, respectively, are added to create an in-phase component I 506 and Quadrature components $Q_r$ 507 and $Q_l$ 508 are added to create a Quadrature component 509.

FIG. 6 is an example diagram of a DD-MZM 600. A Laser Input 601 is received and the DD-MZM 600 inputs MZ-a 602 and MZ-b 603 are biased at the minimum points to realize optical carrier suppression modulation. MZ-c 604 is biased at the orthogonal point to maintain a π/2 phase shift between the two different arms of the modulator.

FIGS. 5-6 are only illustrative. Any known algorithms to perform dual SSB modulation can be utilized. In some embodiments, dual-SSB modulation can be accomplished by the methods described in Zhang, et al., Transmission of 112-Gb/s+ DMT over 80-km SMF Enabled by Twin-SSB Technique at 1550 nm, which is incorporated by reference in its entirety herein, or Chien, Optical Independent-Sideband Modulation for Bandwidth-Economic Coherent Transmission, which is also incorporated by reference in its entirety herein.

The Left SSB Imaging Component L' 405 and Right SSB Imaging Component R' 407, as shown in FIGS. 4A-4B, are induced by the imbalance of I (in-phase) and Q (quadrature) branches of modulators such as those show in FIGS. 5-6 and imperfect characteristics of optical and electrical devices.

Figure 7:
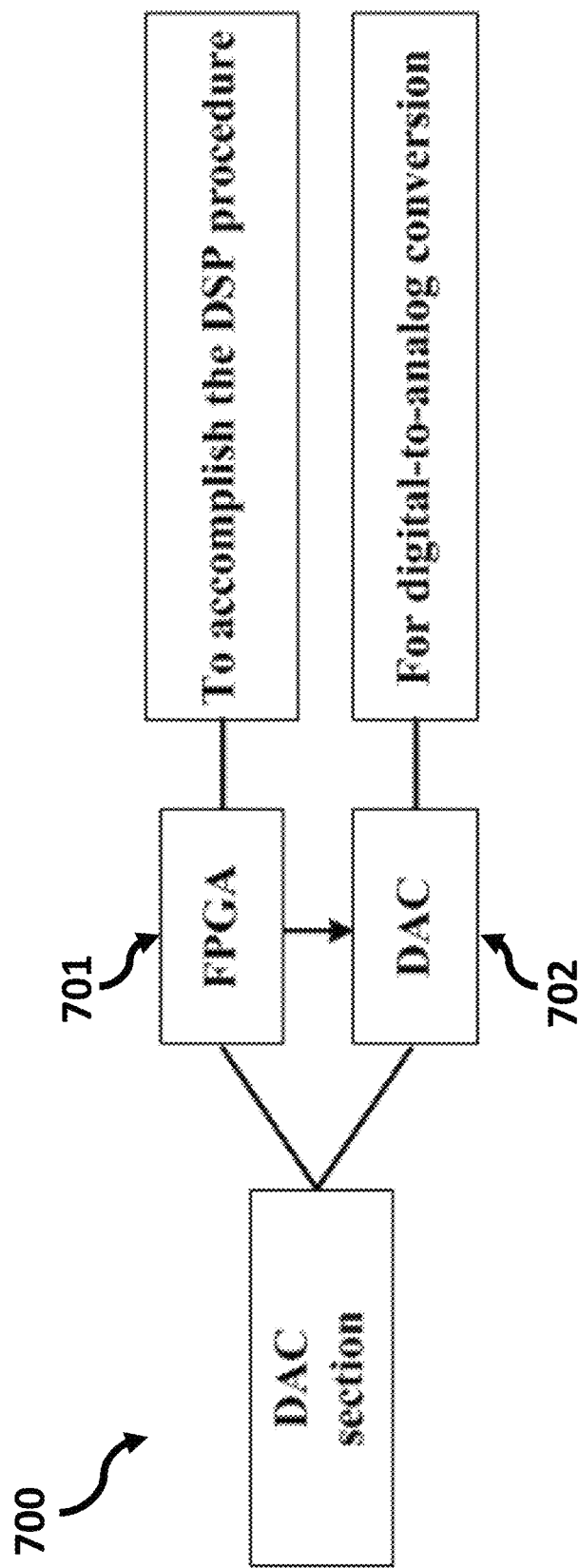
FIG. 7 shows an example diagram of a digital to analog section used to convert digital singles to analog signals.

FIG. 7 shows an example block diagram of a Digital to Analog Section 700. An ASIC (application specific integrated circuit), such as an FPGA (field programmable gate array) 701 can be utilized to provide digital signal processing capabilities. The FPGA 700 is only illustrative and any combination of logic gates, general purpose processors, or digital signal processors can be used. The FPGA 701 is used to operate the Digital to Analog Converter 702.

Figure 8:
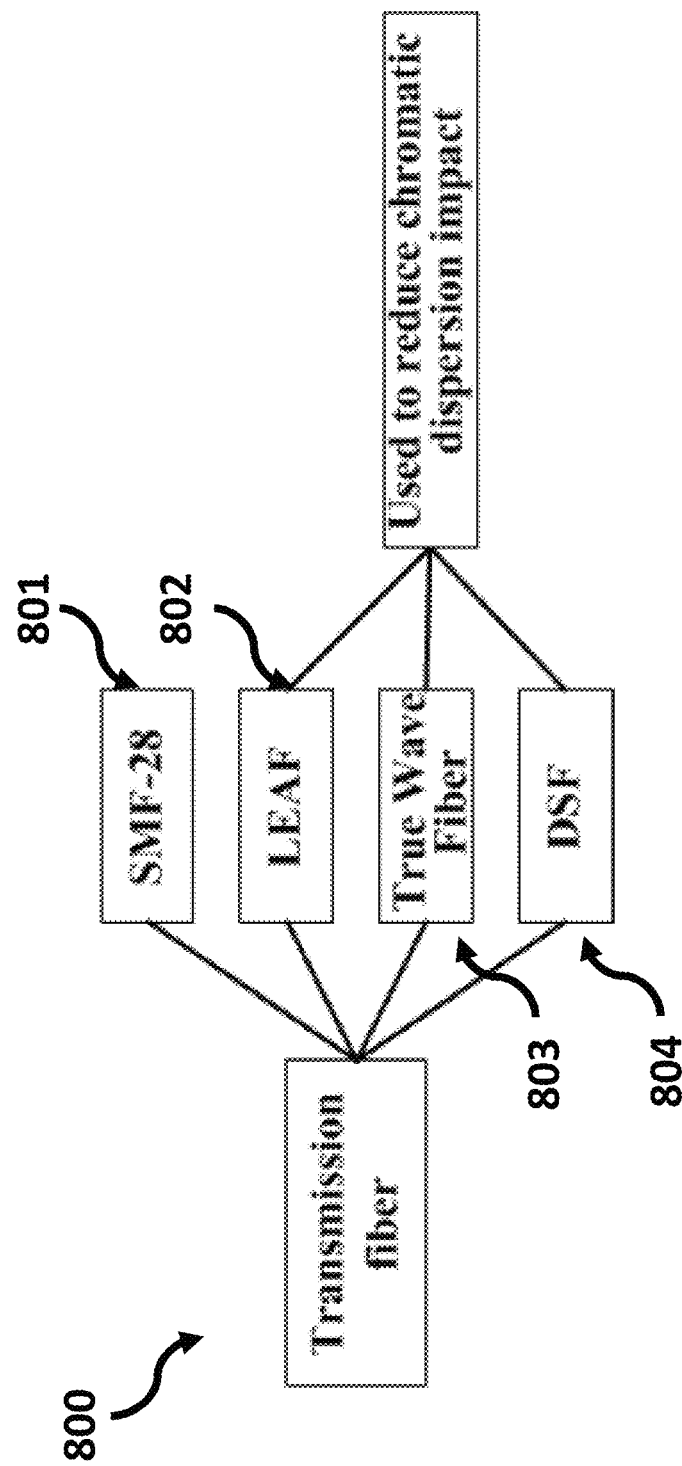
FIG. 8 shows an example diagram of transmission fibers used to transmit optical signals.

FIG. 8 illustrates an example block diagram of Transmission Fiber 800 that can be utilized for transmitting the dual SSB signal. For example, the Transmission Fiber 800 can be SMF-28 801 (single mode optical fiber), LEAF 802 (from Corning), True Wave Fiber 803, or DSF 804 (dispersion shifted fiber). LEAF 802, True Wave Fiber 803, and DSF 804 can be used to reduce chromatic dispersion impact. The types of Transmission Fiber 800 shown are only illustrative and any fiber optic cable can be utilized.

Figures 9A, 9B:
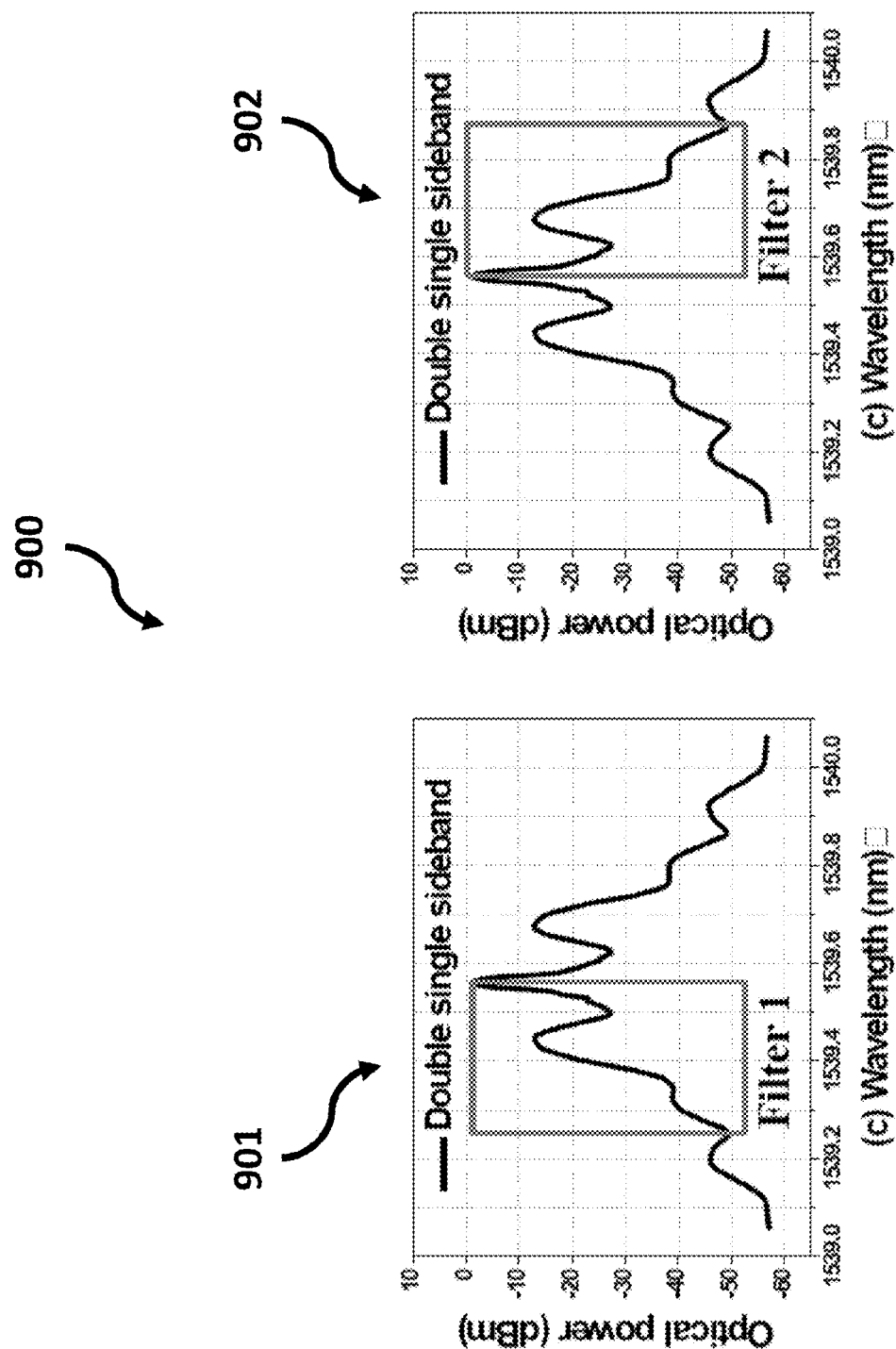
FIGS. 9A-9B show example spectra output of a double single sideband single where certain wavelengths of the signal are band-pass filtered.

FIGS. 9A-9B illustrate example diagrams of an example Dual SSB Signal 900 transmitted by Transmission Fiber 105 and received by Optical Filter Section 1 106 and Optical Filter Section 2 107 of FIG. 1. The left SSB is filtered as shown in Filter 1 901. The right SSB is filtered as shown in Filter 2 902. Band-pass optical filters can be employed to filter out either sidebands. Here, an interleave filter with a 50 Ghz grid is used. The 3-dB, 10-dB, and 20 dB bandwidth of the interleave filter is 42.5 GHz, 54 GHz, and 62.1 GHz, respectively. The filtered single side band will have both the SSB component and the other side's imaging component.

Mathematically, the filtered left SSB signal can be expressed as:

$$E_l(t) = L + R' \qquad \text{Eq. (4)}$$

The right SSB signal can be expressed as:

$$E_r(t) = R + L' \qquad \text{Eq. (5)}$$

After down conversion to baseband and in the time domain, the imaging signal is the conjugate of the original signal where R'=conj(R) and L'=conj(L). Considering the coefficients, the filtered signals $E_l(t)$ and $E_r(t)$ can be written as:

$$\begin{bmatrix} E_l(t) \\ E_r(t) \end{bmatrix} = \begin{bmatrix} h_{11}L(t) + h_{12}\text{conj}(R(t)) \\ h_{21}\text{conj}(L(t)) + h_{22}R(t) \end{bmatrix} \qquad \text{Eq. (6)}$$

Figure 10:
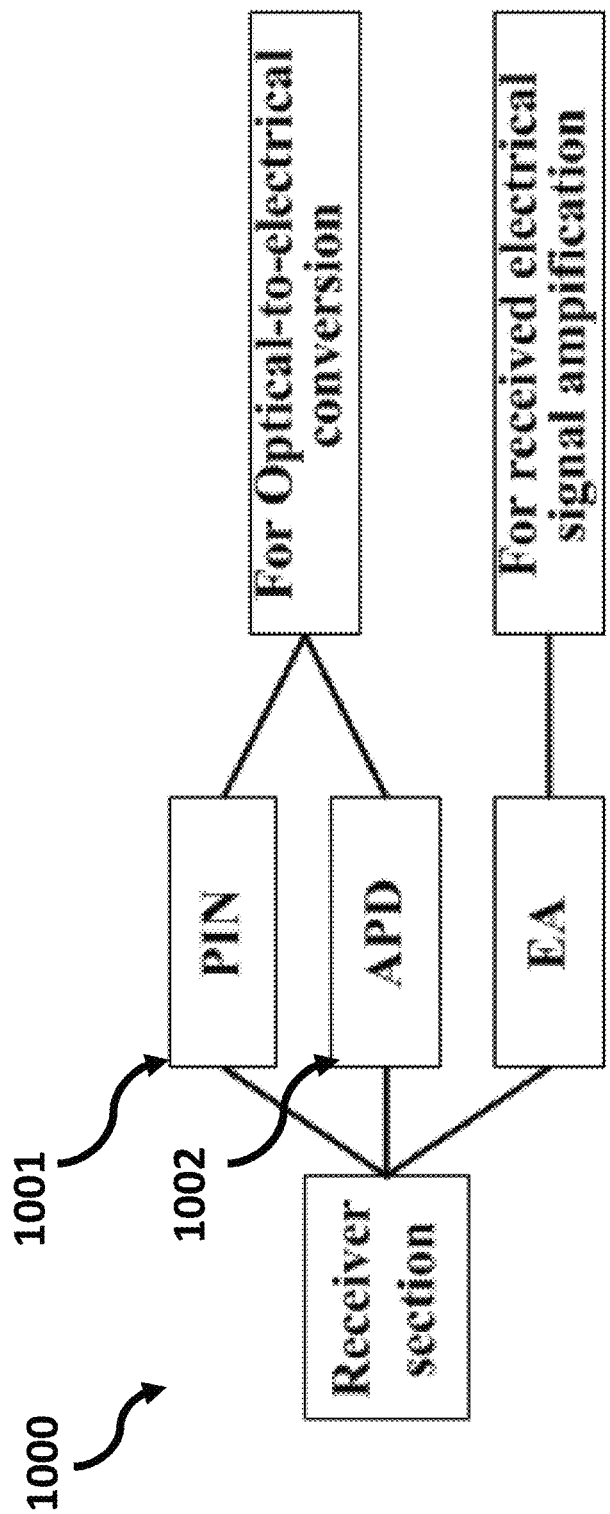
FIG. 10 shows a diagram of a receiver section.

FIG. 10 illustrates an example diagram of the Receiver Section 1000 that receives optical signals from the optical filters for either the right or left SSB. The Receiver Section 1000 can utilize a Positive-Intrinsic Negative Photodiode 1001 or an Avalanche Photodiode 1002 to receive and convert optical signals into electrical signals. The Positive-Intrinsic Negative Photodiode 1001 and Avalanche Photodiode 1002 are only illustrative and any optical to electrical converter can be used. The electric signal from the Positive-Intrinsic Negative Photodiode 1001 or Avalanche Photodiode 1002 can also be electrically amplified or conditioned.

In the electrical domain, the left side band $y_l(t)$, where $y_L(t)$ is the left side band component and $y_R(t)$ is the right side band imaging component, can be expressed as:

$$y_l(t) = y_L(t) + y_R(t) \qquad \text{Eq. (7)}$$

In the electrical domain, the right side band $y_r(t)$, where $y_R(t)$ is the right side band component and $y_L(t)$ is the left side band imaging component, can be expressed as:

$$y_r(t) = y_R(t) + y_L(t) \qquad \text{Eq. (8)}$$

After being converted to the electrical domain and before being down converted to the baseband, the left side band's imaging component can be expressed as:

$$y_L(t) = b y_L(t) \qquad \text{Eq. (9)}$$

After being converted to the electrical domain and before being down converted to the baseband, the right side band's imaging component can be expressed as:

$$y_R(t) = a y_R(t) \qquad \text{Eq. (10)}$$

Figure 11:
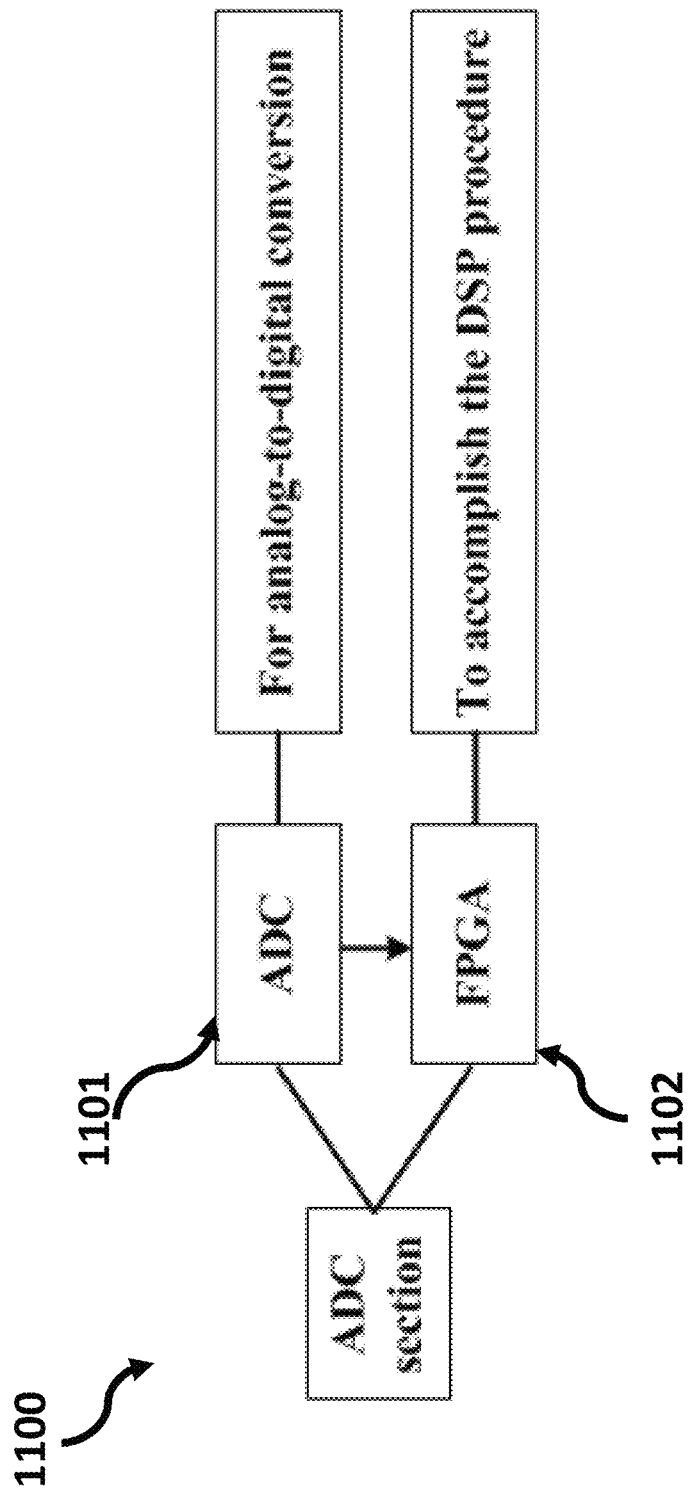
FIG. 11 shows an example diagram of the analog to digital section and example components that may be utilized.

FIG. 11 illustrates an example diagram of the Analog to Digital Section 1100 that can receive electrical signals for either the left or right SSBs from the Receiver Section 1000. The Analog to Digital Section 1100 has an Analog to Digital Converter 1101. An ASIC or an FPGA 1102 is provided to provide digital signal processing capabilities. The FPGA 1102 is only illustrative and any combination of logic gates, general purpose processors, or digital signal processors can be used. The FPGA 1102 is used to operate the Digital to Analog Converter 1101.

As illustrated in FIG. 1, the electrical signals from the Analog to Digital Converter Section 1 110 and Analog to Digital Converter Section 2 111 are inputted into an Imaging Cancellation Section 112. The Imaging Cancellation Section 112 can be performed by a digital signal processor, general purpose processor, an FPGA, or any ASIC.

Figure 12:
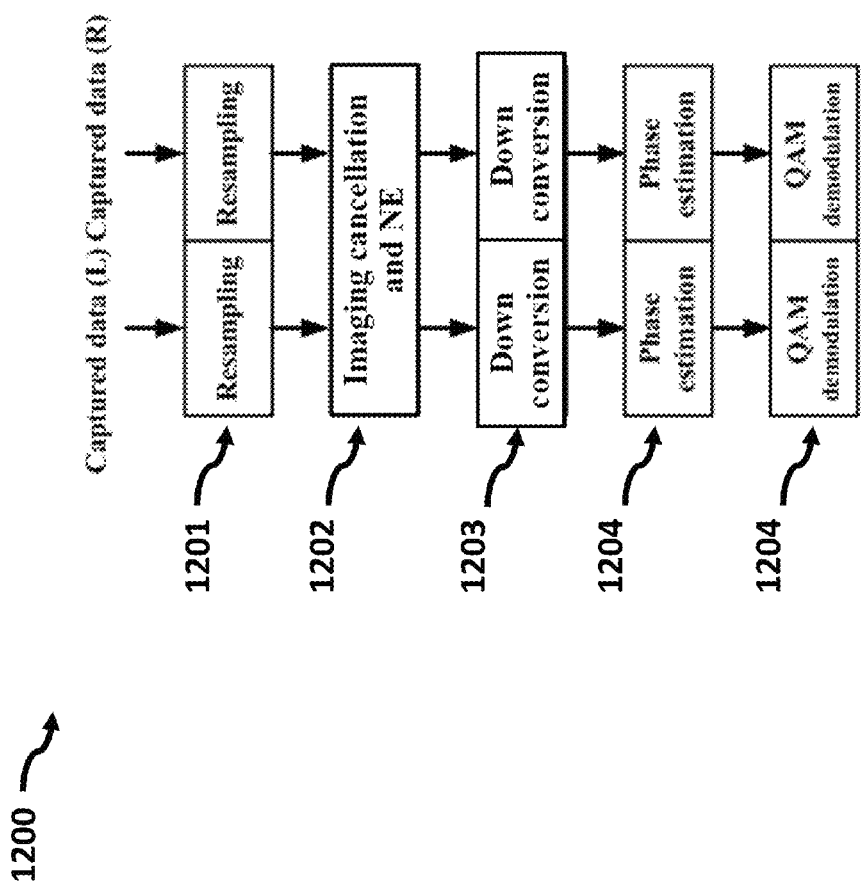
FIG. 12 shows an example flowchart that illustrates how signals are processed and how imaging components of the signals can be removed.

FIG. 12 illustrates an example flowchart 1200 of data processing that can be performed at a DSP. Captured Data for both the left and right SSB obtained from analog to digital converters are resampled at 1201. After being resampled, Imaging Cancellation and Non-Linear Equalization 1202 is performed. In an embodiment, after obtaining the electrical signals, an adaptive equalizer is implemented for imaging cancellation. In another embodiment, the adaptive equalizer utilizes an LMS algorithm to perform imaging cancellation. In another embodiment, the adaptive equalizer utilizes an LMS algorithm to compensate for linear and nonlinear distortions. In yet another embodiment, an LMS algorithm is used to perform either one of, or all of, imaging cancellation, compensation of linear distortions, and compensation of nonlinear distortions.

The equalizer for the left side band signal can be expressed as:

$$y_{l,i} = \sum_{k=-N}^{N} c_{ll,k} x_{l,i-k} + \sum_{k=-N}^{N} c_{lr,k} x_{r,i-k} + \sum_{p=-N}^{N} \sum_{k=-N}^{p-1} c_{l,k}(x_{l,i-p} - x_{l,i-k})^2 \quad \text{Eq. (11)}$$

The equalizer for the right side band signal can be expressed as:

$$y_{r,i} = \sum_{k=-N}^{N} c_{rl,k} x_{l,i-k} + \sum_{k=-N}^{N} c_{rr,k} x_{r,i-k} + \sum_{p=-N}^{N} \sum_{k=-N}^{p-1} c_{r,k}(x_{r,i-p} - x_{r,i-k})^2 \quad \text{Eq. (12)}$$

Where, in Eq. 11 and Eq. 12, x(t) are the input signals for the equalizer and y(t) are the output signals. $c_{lr,k}$ and $c_{rl,k}$ denote the crosstalk coefficients induced, by the imaging for both the left and right SSBs and are used to suppress or eliminate the crosstalk between the left and the right components. $c_{ll,k}$ and $c_{rr,k}$ refer to coefficients relating to linear distortion for both the left and right SSBs. $c_{l,k}$ and $c_{r,k}$ refer to coefficients relating to nonlinear distortion for both the left and right SSBs. In an embodiment, the crosstalk coefficients can be updated by an LMS algorithm to cancel the imaging components of both the left and right single side band signals. In another embodiment, the coefficients relating to linear distortion can be updated by an LMS algorithm to compensate for linear distortion. In another embodiment, the coefficients relating to nonlinear distortion can be updated by an LMS algorithm to compensate for nonlinear distortion. It is understood and envisioned that the LMS algorithm can be utilized to provide any one of, or all of, imaging component cancellation, nonlinear distortion compensation, and linear distortion compensation. Eq. 11 and Eq. 12 are only exemplary and illustrative and it is understood that any structure of an LMS algorithm can be utilized. In an embodiment, an LMS algorithm can be provided for the left SSB to perform imaging cancellation and to compensate for linear and nonlinear distortions. In another embodiment, an LMS algorithm can be provided for the right SSB to perform imaging cancellation and to compensate for linear and nonlinear distortions. In yet another embodiment, an LMS algorithm can be provided for both the right and left SSB to perform imaging cancellation and to compensate for linear and nonlinear distortions. The LMS algorithm may be implemented to minimize error criteria that includes linear and/or non-linear distortions. Separate filters may be used for each of the main left and right SSB and cross-talk distortions.

Returning to FIG. 12, after going through imaging cancellation and non-linearity equalization, the signals are then Down Converted 1203. After, a Phase Estimation Step 1204 is employed and the resulting signal is QAM Demodulated 1205 to determine data-points.

Adaptive equalization and LMS algorithms can be performed on a digital signal processor, general purpose processor, FPGA, or ASIC to remove the imaging components. In some embodiments, LMS algorithms such as those described in U.S. Publication No. US 2013/0272719 to Yan et al. to calculate coefficients through an adaptive algorithm, such as a LMS algorithm, can be employed through a DSP, general purpose processor, FPGA, or ASIC, to perform nonlinearity mitigation. The entire content of U.S. Publication No. US 2013/0272719 to Yan et al. is incorporated by reference in its entirety herein.

Figure 13:
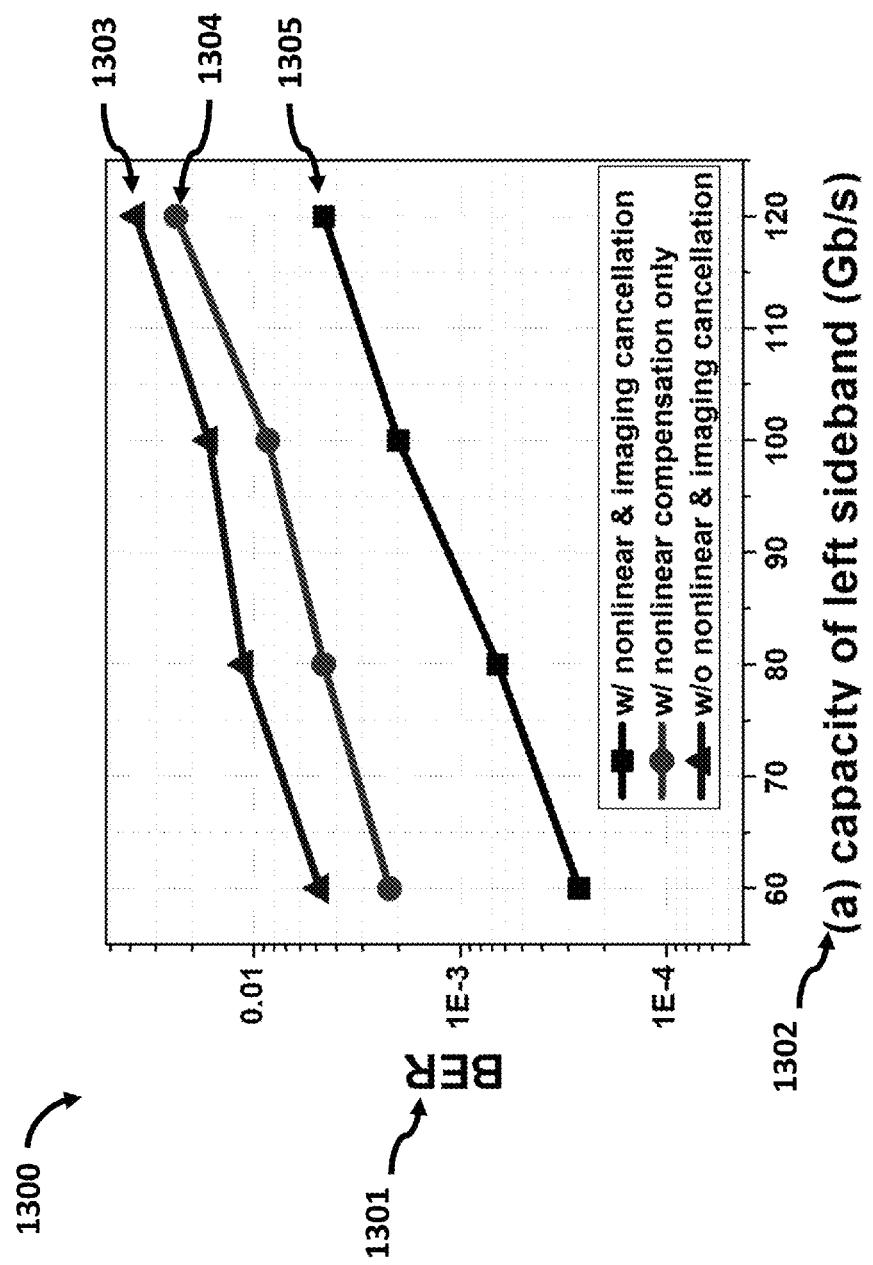
FIG. 13 shows an example output signal graph showing bit error rate with respect to the capacity of a left sideband in Gb/s.

FIG. 13 illustrates example Output Results 1300 of a left side band signal of an optical communication system. The Output Results provide a bit error rate (BER) 1301 with respect to capacity of the left sideband (Gb/s) 1302. In an embodiment, an optical communication system that does not perform nonlinear compensation and does not perform imaging cancellation 1303 suffers from a high BER; the optical communication system shows a lower BER if nonlinear compensation, but no imaging cancellation, 1304 is utilized; and the optical communication system shows an even lower BER if nonlinear compensation and imaging cancellation 1305 is utilized. Applying nonlinear compensation and imaging cancellation can improve the capacity of each sideband. In an embodiment, the right side band (not shown) has similar results to that of the left side band shown in FIG. 13.

Figure 14:
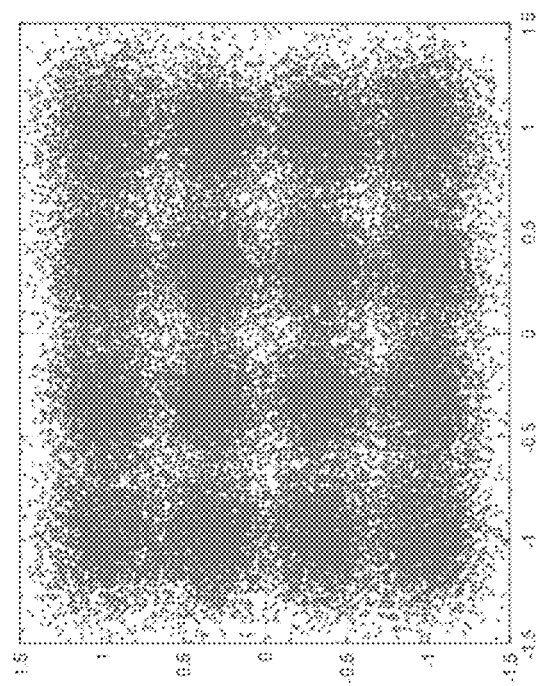
FIGS. 14-16 illustrate example constellation diagrams of outputs of a system where nonlinear compensation and imaging cancellation are not used, where nonlinear compensation is used but imaging cancellation is not, and where both imaging cancellation and nonlinear compensation are used.

FIG. 14 illustrates an example Constellation Map 1400 of the left SSB of an optical communication system running at 120 Gb/s where neither nonlinear compensation and imaging cancellation are performed. As can be seen here, and as seen in element 1303 of FIG. 13, the optical communication system suffers from a higher BER if nonlinear compensation and imaging cancellation is not performed.

Figure 15:
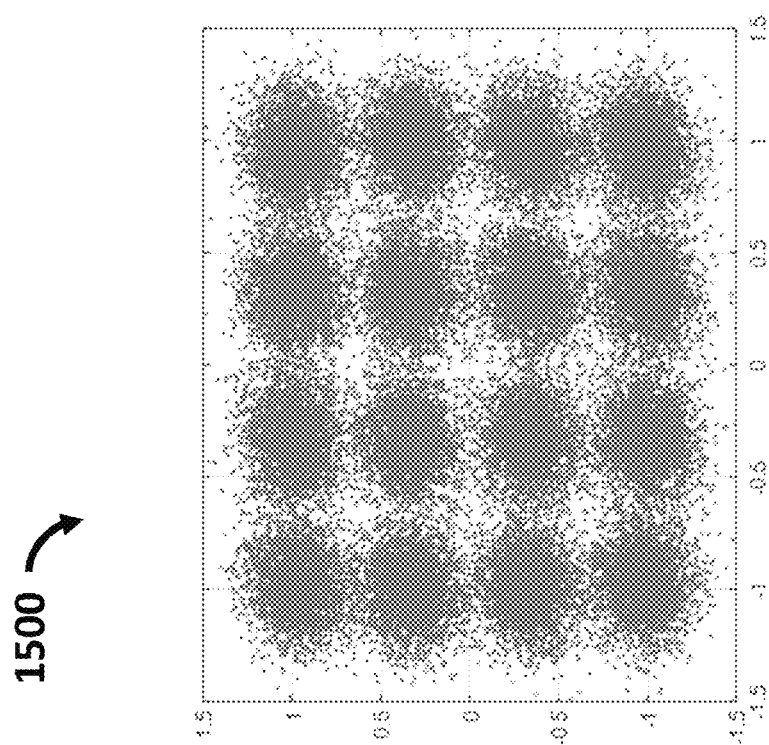

FIG. 15 illustrates an example Constellation Map 1500 of the left SSB of an optical communication system running at 120 Gb/s where nonlinear compensation is performed but imaging cancellation is not performed. As can be seen here, and as seen in element 1304 of FIG. 13, the optical communication system shows a lower BER if nonlinear compensation is performed.

Figure 16:
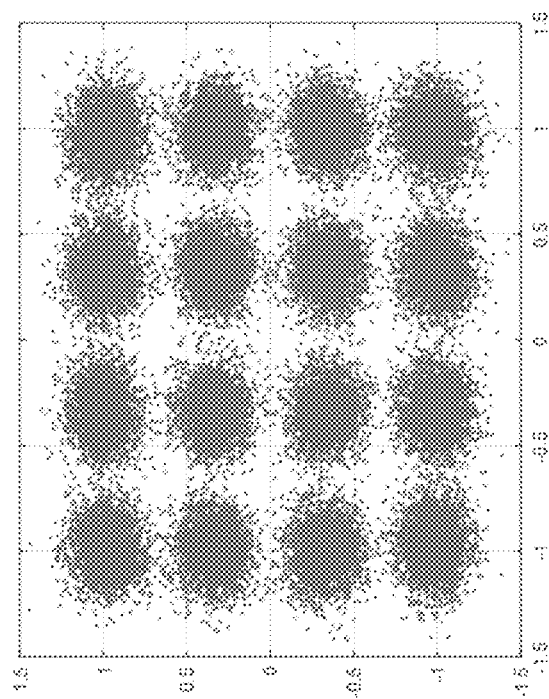

FIG. 16 illustrates an example Constellation Map 1600 of the left SSB of an optical communication system running at 120 Gb/s where both nonlinear compensation and imaging cancellation are performed. As can be seen here, and as seen in element 1305 of FIG. 13, the optical communication system shows a lower BER if nonlinear compensation and imaging cancellation is performed.

FIGS. 14-16 are only illustrative. It is considered that any number of constellation points can be utilized. Further, it is considered that an optical system can utilize any one of imaging cancellation, nonlinear distortion compensation, and linear distortion compensation.

Figure 17:
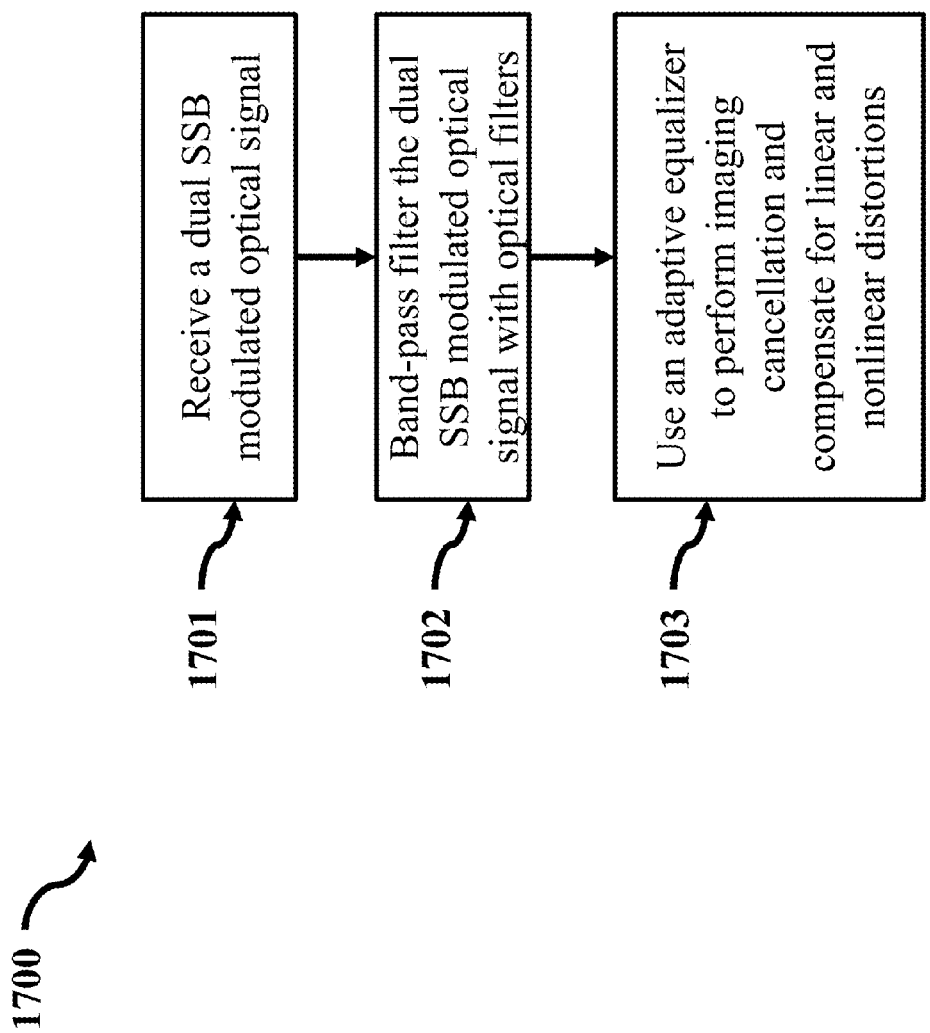
FIG. 17 shows an example flowchart that illustrates a method of optical communication.

FIG. 17 illustrates an example flowchart 1700 that illustrates the reception and processing of optical signals in an optical system. A dual SSB modulated optical signal is received at 1701. The dual SSB signal can be generated by one of several well-known techniques. In some embodiments, an optical laser can be used to generate an optical source and that source signal can be and modulated with any modulator known to generate dual SSB signals as shown in FIGS. 5-6. In some embodiments, the dual SSB signal includes two signal components: a left component and a right component, where the left component occupies approximately a left half, or a lower frequency half, of the frequency band, and has a left imaging component that occupies the remaining other half of the frequency band generally in the same spectral region as the right component, which has a corresponding right imaging component in the half of the spectrum occupied by the left component. In some embodiments, an IQ Modulator or DD-MZM Modulator can be utilized to generate dual SSB signals. In some embodiments, each of the left component and the right component may carry different and independent data, e.g., user data and/or control data, for communication in the optical system.

The data signals to the modulator used can be from any known processor, ASIC, or FPGA. The software or hardware can be used to modulate the dual SSB signal in any known modulation format. In some embodiments, the dual SSB modulated optical signal is modulated with DMT. In some embodiments, the dual SSB modulated optical signal is modulated with OFDM. In some embodiments, the dual SSB signal is transmitted with WDM (wavelength division multiplexing). In some embodiments, the dual SSB signal is modulated with carrier-less amplitude phase modulation (CAP). In some embodiments, the dual SSB signal is modulated with QAM.

The system then band-pass filters the dual SSB modulated optical signal with optical filters at 1702. The band-pass filters filter the left and right SSB of the dual SSB modulated optical signal. In some embodiments, the optical signals can be converted to electrical signals prior to being filtered. In some embodiments, certain photodiodes, e.g., as those shown in FIG. 10 can be utilized such as a positive-intrinsic negative photodiode or avalanche photodiode, for example, to receive optical signals and convert them to electrical signals. In some embodiments, after converting to the electrical domain, the electrical signals can be electrically filtered. In other embodiments, the electrical signals can be converted to digital signals and the digital signals can be filtered via software. In other embodiments, the optical signals are optically filtered and thereafter converted to the electrical domain. In other embodiments, the band-pass filters are optical filters and the filtered optical signals are thereafter converted to electrical signals.

At 1703, an adaptive equalizer is used to perform imaging cancelation and nonlinearity compensation on the dual SSB signal at 1703 that may have been present in the received dual SSB modulated signals in step 1701. As illustrated in equations 11 and 12 of an exemplary equalizer, the coefficients can be updated by a LMS algorithm to perform imaging cancellation, linear distortion compensation, and nonlinear distortion compensation. The LMS algorithm can be performed in a digital signal processor, general purpose processor, ASIC, FPGA, or any similar or known circuit configuration. It is considered that any one, or all of, imaging cancellation, linear distortion compensation, and nonlinear distortion compensation can be utilized. The signals thus generated after image cancellation may be demodulated using SSB demodulation and the modulated data may be recovered from the left component and the right component. Any SSB demodulation technique may be used for recovering data from the electrical domain signal after imaging cancellation is performed.

Figure 18:
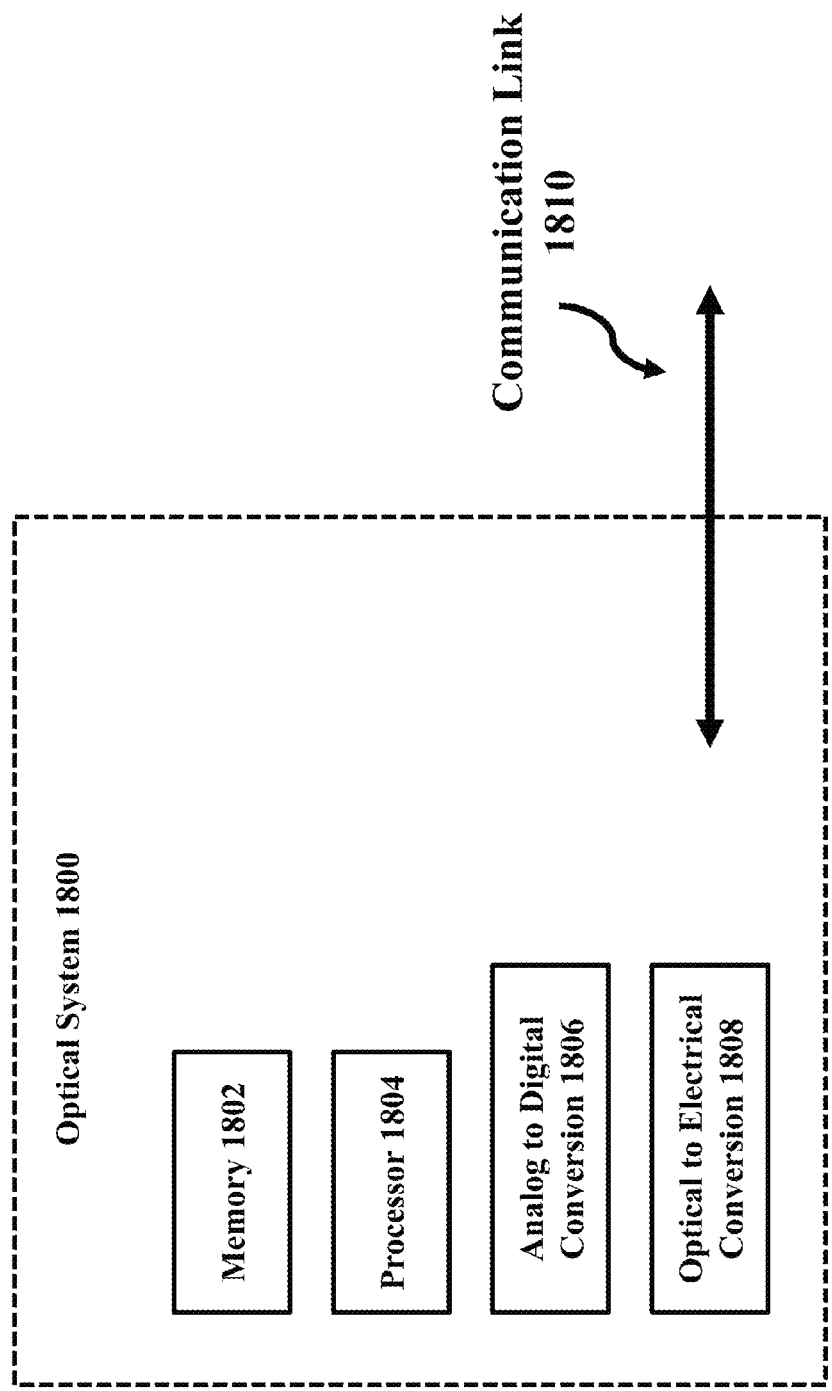
FIG. 18 shows a block diagram of an example of an optical communication system that can be used to receive and transmit information.

FIG. 18 is a block diagram of an example optical communication system 1800. The optical communication system 1800 includes a memory 1802, a processor, e.g., a digital signal processor, 1804, an analog to digital conversion section 1806 and an optical to electrical conversion section 1808, e.g., a photodiode that receives the modulated optical signal via a communication link 1810 and produces an electrical signal. In another embodiment, the optical to electrical conversion section 1808 contains a modulator to modulate optical signals and a laser diode source to generate optical signals. In another embodiment, although not shown, the optical system 1800 has filters such as optical band-pass or electrical band-pass filters. In another embodiment, although not shown, the optical system 1800 has amplifiers and signal conditioners. The optical communication system can be utilized to transmit or receive optical signals.

The memory 1802 stores instructions that, when executed, cause the processor 1804 to process the digital samples to generate estimates of transmitted bits. The instructions include instructions for performing resampling and synchronization of the digital samples and instructions for down converting data. In another embodiment, the memory 1802 also has instructions to perform Fourier transforms to recover QAM modulated signals, instructions for applying post-equalization to the QAM signals to generate equalized QAM signals, instructions to generate QAM signals, and instructions for generating and decoding QAM maps. The memory 1802 further comprises instructions to perform imaging cancellation and compensation of linear and non-linear distortions.

Figure 19:
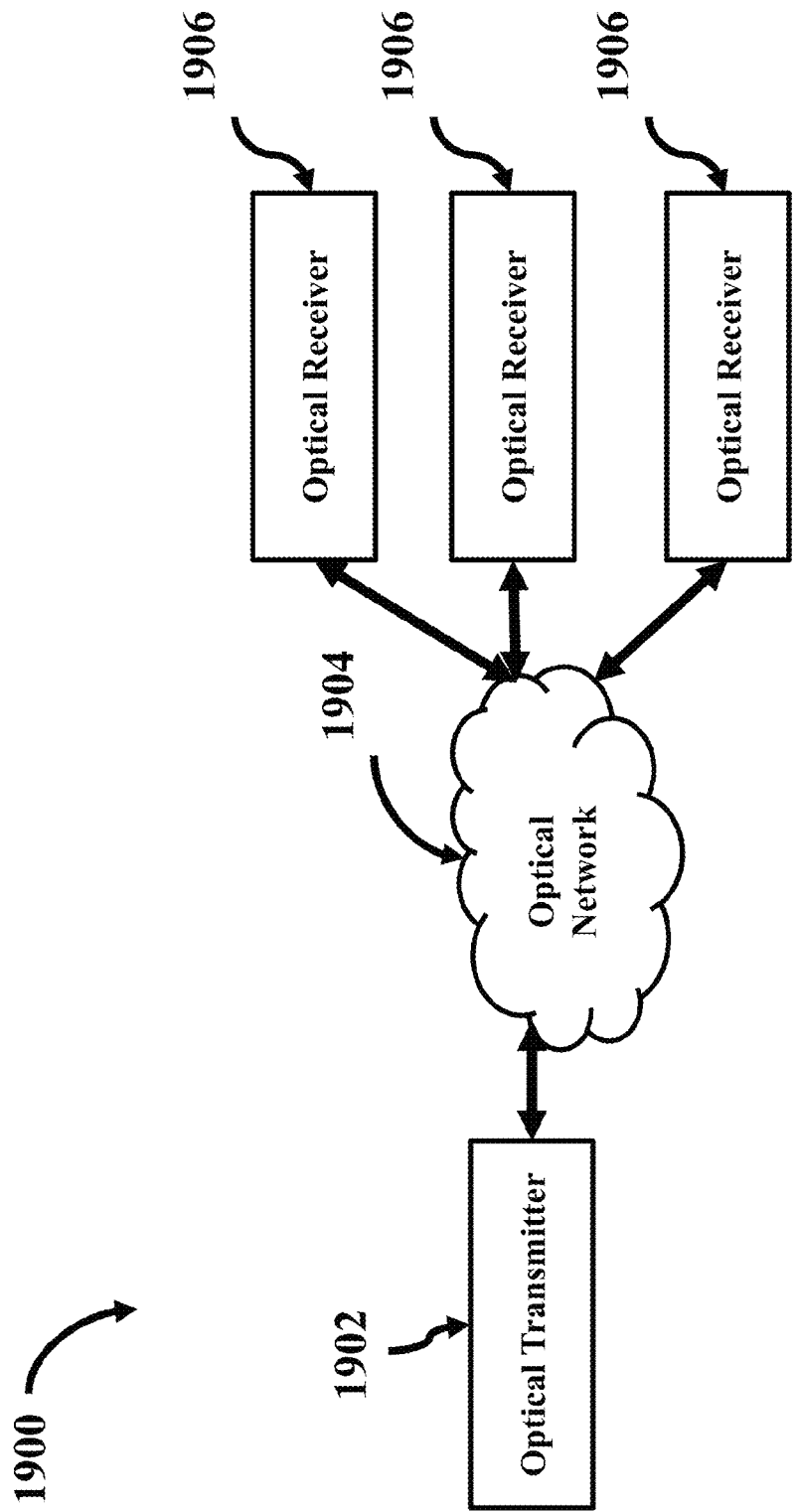
FIG. 19 illustrates an example representation of an example optical communication network.

FIG. 19 illustrates an example optical communication system 1900 in which the disclosure can be embodied. One or more optical transmitters 1902 are communicatively coupled via an optical network 1904 with one or more optical receivers 1906. The optical network 1904 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 19 for clarity. Various techniques disclosed in this document can be implemented by apparatus 1902, 1906 in the transmission network 1900. The optical communication system can be used with one or more optical transmitters and one or more optical receivers communicatively coupled via an optical network. The transmitted optical signals may go through intermediate optical equipment such as amplifiers, repeaters, switch, etc.

The optical systems discussed are only illustrative. Any optical system utilized can include a processor having a memory including software code for performing the techniques described herein, including code for performing Fourier transforms to recover and demodulate QAM modulated signals.

While the techniques are described specifically with reference to optical communication embodiments, it will be appreciated that the techniques can also be used for receiving signals transmitted over other physical mediums such as air, copper and coaxial cable.

It will be appreciated that techniques for receiving and processing two single side band modulated signals, e.g., I and Q components, whose images occupy frequency bands of the corresponding main signal components are disclosed.

It will further be appreciated that the disclosed techniques advantageously facilitate the use of high order intensity modulation to modulate and transmit data from a transmitter to a receiver, while the receiver is able to digitally process the received signal so as to extract each constellation (e.g., FIGS. 14-16).

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method, implemented at a receiver in an optical network, comprising:
    receiving a dual single side band (SSB) modulated optical signal on a transmission fiber, wherein the dual SSB modulated optical signal includes a left SSB modulated optical signal and a right SSB modulated optical signal;
    band-pass filtering the dual SSB modulated optical signal with optical filters to obtain the left SSB modulated optical signal and the right SSB modulated optical signal;
    converting the left SSB modulated optical signal to a left SSB modulated electrical signal, and the right SSB modulated optical signal to a right SSB modulated electrical signal;
    resampling the left and the right SSB modulated electrical signals; and
    implementing a least means square (LMS) algorithm for performing one or more of imaging cancellation, compensation of linear distortions, and compensation of nonlinear distortions on the resampled left and right SSB modulated electrical signals, wherein the imaging cancellation is performed with one or more finite impulse response (FIR) filters that comprises coefficients, the coefficients being updated by the LMS algorithm.

2. The method of claim 1, wherein the coefficients comprise crosstalk coefficients induced due to imaging from the dual SSB modulated optical signal.

3. The method of claim 1, wherein the LMS algorithm includes minimizing one or more of linear and non-linear distortions by updating coefficients relating to one or more of linear and nonlinear distortions.

4. The method of claim 1, further comprising digitizing the left and the right SSB modulated electrical signals.

5. The method of claim 1, further comprising electrically amplifying the left and the right SSB modulated electrical signals.

6. The method of claim 1, wherein the dual SSB modulated optical signal is modulated with orthogonal frequency division multiplexing (OFDM).

7. The method of claim 1, wherein the dual SSB modulated optical signal is modulated with a Dual Drive Mach-Zehnder Modulator.

8. The method of claim 1, wherein the dual SSB modulated optical signal is transmitted using wavelength-division multiplexing (WDM).

9. The method of claim 1, wherein the dual SSB modulated optical signal is modulated with discrete multi-tone modulation (DMT).

10. The method of claim 1, wherein the dual SSB modulated optical signal is modulated with quadrature amplitude modulation (QAM).

11. A method, implemented at a receiver in an optical network, comprising:
    receiving a dual single side band (SSB) modulated optical signal on a transmission fiber, wherein the dual SSB modulated optical signal includes a left SSB modulated optical signal and a right SSB modulated optical signal;
    band-pass filtering the dual SSB modulated optical signal with optical filters to obtain the left SSB modulated optical signal and the right SSB modulated optical signal;
    converting the left SSB modulated optical signal to a left SSB modulated electrical signal, and the right SSB modulated optical signal to a right SSB modulated electrical signal;
    resampling the left and the right SSB modulated electrical signals; and
    implementing a least means square (LMS) algorithm for performing one or more of imaging cancellation, compensation of linear distortions, and compensation of nonlinear distortions on the resampled left and right SSB modulated electrical signals, wherein the LMS algorithm comprises a first algorithm for the resampled right SSB modulated electrical signal and a second algorithm for the resampled left SSB modulated electrical signal.

12. A method, implemented at a receiver in an optical network, comprising:
    receiving a dual single side band (SSB) modulated optical signal on a transmission fiber, wherein the dual SSB modulated optical signal includes a left SSB modulated optical signal and a right SSB modulated optical signal;
    band-pass filtering the dual SSB modulated optical signal with optical filters to obtain the left SSB modulated optical signal and the right SSB modulated optical signal;
    converting the left SSB modulated optical signal to a left SSB modulated electrical signal, and the right SSB modulated optical signal to a right SSB modulated electrical signal;
    resampling the left and the right SSB modulated electrical signals; and
    implementing a least means square (LMS) algorithm for performing one or more of imaging cancellation, compensation of linear distortions, and compensation of nonlinear distortions on the resampled left and right SSB modulated electrical signals;
    down-converting and estimating a phase of outputs of the resampled left and right SSB modulated electrical signals after performing the one or more of imaging cancellation, the compensation of linear distortions, or the compensation of nonlinear distortions.

13. The method of claim 12, further comprising de-modulating using a result of the phase estimation.

14. A receiver in an optical network, comprising:
    a first optical band-pass filter and a second optical band-pass filter configured to receive a dual single side band (SSB) modulated optical signal on a transmission fiber, wherein:
        the dual SSB modulated optical signal includes a left SSB modulated optical signal and a right SSB modulated optical signal,
        the first optical band-pass filter configured to band-pass filter the dual SSB optical signal to obtain the left SSB modulated optical signal, and the second optical band-pass filter configured to band-pass filter the dual SSB optical signal to obtain the right SSB modulated optical signal;
    a first photodiode configured to convert the left SSB modulated optical signal to a left SSB modulated electrical signal;
    a second photodiode configured to convert the right SSB modulated optical signal to a right SSB modulated electrical signal; and
    a processor configured to resample the left and the right SSB modulated electrical signals;
    an adaptive equalizer configured to utilize a least means square (LMS) algorithm to perform one or more of imaging cancellation, compensation of linear distortions, and compensation of nonlinear distortions on the resampled left and right SSB modulated electrical signals, wherein the adaptive equalizer is enabled to perform imaging cancellation with one or more finite impulse response (FIR) filters that comprises coefficients, the coefficients configured to being updated by the LMS algorithm.

15. The receiver of claim 14, wherein the coefficients comprise crosstalk coefficients for cancelling imaging from the dual SSB modulated optical signal.

16. The receiver of claim 14, wherein the LMS algorithm is used to further compensate for one or more of linear and nonlinear distortions by updating coefficients relating to one or more of linear and nonlinear distortions.

17. The receiver of claim 14, wherein the processor is further configured to estimate a phase of the resampled left and right SSB modulated electrical signals.

18. The receiver of claim 17, further comprising one or more demodulators configured to demodulate the phase estimated resampled left and right SSB modulated electrical signals.

19. The receiver of claim 14, further comprising an analog to digital converter configured to digitize the left and the right SSB modulated electrical signals.

20. The receiver of claim 14, further comprising an amplifier configured to electrically amplify the left and the right SSB modulated electrical signals.

21. The receiver of claim 14, wherein the dual SSB modulated optical signal is modulated with orthogonal frequency division multiplexing (OFDM).

22. The receiver of claim 14, wherein the dual SSB modulated optical signal is modulated with a Dual Drive Mach-Zehnder Modulator.

23. The receiver of claim 14, wherein the dual SSB modulated optical signal is transmitted using wavelength-division multiplexing (WDM).

24. The receiver of claim 14, wherein the dual SSB modulated optical signal is modulated with carrier-less amplitude phase modulation (CAP).

25. The receiver of claim 14, wherein the dual SSB modulated optical signal is modulated with quadrature amplitude modulation (QAM).

26. A receiver in an optical network, comprising:
a first optical band-pass filter and a second optical band-pass filter configured to receive a dual single side band (SSB) modulated optical signal on a transmission fiber, wherein:
the dual SSB modulated optical signal includes a left SSB modulated optical signal and a right SSB modulated optical signal,
the first optical band-pass filter configured to band-pass filter the dual SSB optical signal to obtain the left SSB modulated optical signal, and the second optical band-pass filter configured to band-pass filter the dual SSB optical signal to obtain the right SSB modulated optical signal;
a first photodiode configured to convert the left SSB modulated optical signal to a left SSB modulated electrical signal;
a second photodiode configured to convert the right SSB modulated optical signal to a right SSB modulated electrical signal; and
a processor configured to resample the left and the right SSB modulated electrical signals;
an adaptive equalizer configured to utilize a least means square (LMS) algorithm to perform one or more of imaging cancellation, compensation of linear distortions, and compensation of nonlinear distortions on the resampled left and right SSB modulated electrical signals, wherein the LMS algorithm comprises a first algorithm for the resampled right SSB modulated electrical signal and a second algorithm for the resampled left SSB modulated electrical signal.

27. An optical communication system, comprising:
a transmitter configured to transmit a dual single side band (SSB) modulated optical signal on a transmission fiber, wherein the dual SSB modulated optical signal includes a left SSB modulated optical signal and a right SSB modulated optical signal;
a receiver configured to receive the dual SSB modulated optical signal, wherein the receiver includes:
a first optical band-pass filter configured to band-pass filter the dual SSB optical signal to obtain the left SSB modulated optical signal, and
a second optical band-pass filter configured to band-pass filter the dual SSB optical signal to obtain the right SSB modulated optical signal;
a first photodiode configured to convert the left SSB modulated optical signal to a left SSB modulated electrical signal;
a second photodiode configured to convert the right SSB modulated optical signal to a right SSB modulated electrical signal;
a processor configured to resample the left and the right SSB modulated electrical signal; and
an adaptive equalizer configured to utilize a least means square (LMS) algorithm to perform one or more of imaging cancellation, compensation of linear distortions, and compensation of nonlinear distortions on the resampled left and right SSB modulated electrical signals, wherein the adaptive equalizer is enabled to perform imaging cancellation with one or more finite impulse response (FIR) filters that comprises coefficients, the coefficients configured to being updated by the LMS algorithm.

28. The optical communication system of claim 27, wherein the coefficients comprise crosstalk coefficients induced from imaging from the dual SSB modulated optical signal.

29. The optical communication system of claim 27, wherein the LMS algorithm is enabled to further compensate for one or more of linear and nonlinear distortions by updating coefficients relating to one or more of linear and nonlinear distortions.

30. An optical communication system, comprising:
a transmitter configured to transmit a dual single side band (SSB) modulated optical signal on a transmission fiber, wherein the dual SSB modulated optical signal includes a left SSB modulated optical signal and a right SSB modulated optical signal;
a receiver configured to receive the dual SSB modulated optical signal, wherein the receiver includes:
a first optical band-pass filter configured to band-pass filter the dual SSB optical signal to obtain the left SSB modulated optical signal, and
a second optical band-pass filter configured to band-pass filter the dual SSB optical signal to obtain the right SSB modulated optical signal;
a first photodiode configured to convert the left SSB modulated optical signal to a left SSB modulated electrical signal;
a second photodiode configured to convert the right SSB modulated optical signal to a right SSB modulated electrical signal;
a processor configured to resample the left and the right SSB modulated electrical signal; and
an adaptive equalizer configured to utilize a least means square (LMS) algorithm to perform one or more of imaging cancellation, compensation of linear distortions, and compensation of nonlinear distortions on the resampled left and right SSB modulated electrical signals, wherein the LMS algorithm comprises a first algorithm for the resampled right SSB modulated electrical signal and a second algorithm for the resampled left SSB modulated electrical signal.

* * * * *